United States Patent [19]
Abe et al.

[11] Patent Number: 5,649,049
[45] Date of Patent: Jul. 15, 1997

[54] HONEYCOMB HEATER HAVING LARGE HYDRAULIC DIAMETER ORIFICES TO NARROW CURRENT FLOW

[75] Inventors: Fumio Abe, Handa; Tomoharu Kondo, Toki; Keiji Noda, Nagoya, all of Japan

[73] Assignee: NGK Insulators, Ltd., Japan

[21] Appl. No.: 354,437

[22] Filed: Dec. 12, 1994

[30] Foreign Application Priority Data

Dec. 14, 1993 [JP] Japan ................. 5-313755

[51] Int. Cl.⁶ .................. F24H 1/10; F01N 3/10
[52] U.S. Cl. ............... 392/494; 219/552; 60/300; 55/DIG. 30; 422/174; 392/488
[58] Field of Search ..................... 219/552–553; 392/485, 488, 494; 60/300; 55/DIG. 30; 422/174, 180, 199, 211

[56] References Cited

U.S. PATENT DOCUMENTS

| | | | |
|---|---|---|---|
| 4,598,686 | 7/1986 | Lupoli et al. | 123/519 |
| 4,851,015 | 7/1989 | Wagner et al. | 55/DIG. 30 |
| 5,063,029 | 11/1991 | Mizuno et al. | 422/174 |
| 5,177,961 | 1/1993 | Whittenberger | 60/300 |
| 5,370,943 | 12/1994 | Brück et al. | 428/593 |
| 5,399,841 | 3/1995 | Abe et al. | 219/552 |
| 5,501,842 | 3/1996 | Rajnik et al. | 422/174 |
| 5,514,347 | 5/1996 | Ohasi et al. | 422/174 |

FOREIGN PATENT DOCUMENTS

| | | |
|---|---|---|
| 0 465 184 | 1/1992 | European Pat. Off. . |
| 0 502 731 | 9/1992 | European Pat. Off. . |
| WO92/13635 | 8/1992 | WIPO . |

*Primary Examiner*—Teresa J. Walberg
*Assistant Examiner*—Raphael Valencia
*Attorney, Agent, or Firm*—Parkhurst, Wendel & Burr, L.L.P.

[57] ABSTRACT

A honeycomb heater including a honeycomb structure which is made of a conductive material and which has a number of passages substantially parallel to a gas flow direction partitioned by partition walls and which has respective providing a gas inlet and a gas outlet, and at least two electrodes for electrification provided on the honeycomb structure. The honeycomb heater is characterized in that besides the passages, orifices which have a larger hydraulic diameter than the passages and which narrow a current flow path are formed at predetermined positions of the honeycomb structure to adjust resistance, whereby a specific region of the honeycomb heater is locally heated more quickly as compared with other regions at the time of the electrification.

6 Claims, 5 Drawing Sheets

////  Quick Heating Portion

////// Quick Heating Portion

Fig. 3(a)
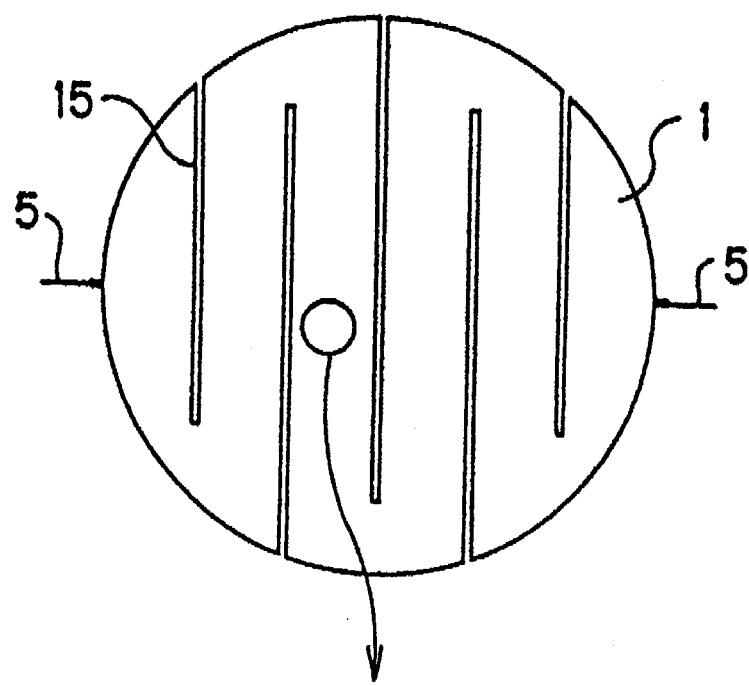
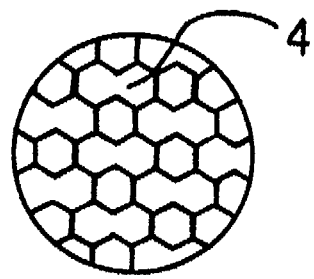
Fig. 3(b)
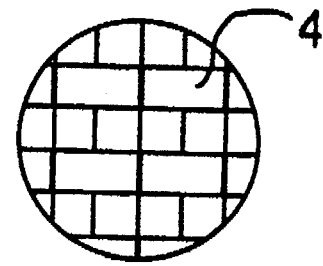
Fig. 3(c)

PRIOR ART

HONEYCOMB HEATER HAVING LARGE HYDRAULIC DIAMETER ORIFICES TO NARROW CURRENT FLOW

BACKGROUND OF THE INVENTION (i) Field of the Invention

The present invention relates to an electrical heating type honeycomb heater which can suitably be used in an exhaust gas purification system for effectively purifying harmful components such as hydrocarbons (HC), carbon monoxide (CO) and nitrogen oxides ($NO_x$) in an exhaust gas exhausted from an internal combustion engine, particularly HC generated in large quantities at the time of an engine start (at a cold start).

(ii) Description of the Prior Art

Heretofore, the research and development of an automobile exhaust gas purification system for purifying harmful components such as HC, CO and $NO_x$ in an exhaust gas of a car have been actively carried out, but particularly in recent years, the purification of these harmful substances at a cold start of a car has been an important technical theme with the intensification of exhaust gas regulations.

That is to say, when the temperature of such an exhaust gas as exhausted immediately after the start of an engine is low, a catalyst does not reach its functional temperature, and so the purification ability of the catalyst is poor. In addition, at this time, HC are exhausted in a larger amount than at the time of a steady running.

As one means for solving such a technical problem, much attention has been paid to a technique in which an electrical heating type heater is electrified before or simultaneously with the start of the engine to quickly heat the catalyst supported on the heater, the so-called light-off catalyst and main catalyst and the like closely arranged in the rear of the heater up to the functional temperature of the catalysts.

For example, Japanese Patent Application Laid-open No. 295184/1991 which has been filed by the present applicants discloses a resistance adjustable type heater in which at least two electrodes for electrification are attached to a honeycomb structure having a number of passages, and a resistance adjusting means comprising slits or the like is provided between the electrodes.

However, in the resistance adjustable type heater described in Japanese Patent Application Laid-open No. 295184/1991, a heating rate is low, when the whole heater is heated and a low electric power is applied. Thus, the catalyst supported on the heater cannot reach an ignition temperature in a short period of time, with the result that most of HC generated in large quantities at the time of a cold start is passed through the catalyst without being purified. On the other hand, if a large electric power is applied to quickly heat the heater, a large-capacity battery, heavy cables and a control device are required.

SUMMARY OF THE INVENTION

In view of such conventional circumstances, the present invention has been completed. An object of the present invention is to provide a honeycomb heater which can exert a suitable purification performance by the application of a low electric power.

For the achievement of the above-mentioned object, according to the present invention, there is provided a honeycomb heater comprising a honeycomb structure which is made of a conductive material and which has a number of passages substantially parallel to a gas flow direction partitioned by partition walls and which has both end surfaces on a gas inlet side and a gas outlet side, and at least two electrodes for electrification provided on the honeycomb structure. The honeycomb heater is characterized in that besides the passages, orifices which have a larger hydraulic diameter than the passages and which narrow a current flow path are formed at predetermined positions of the honeycomb structure to adjust resistance, whereby a specific region of the honeycomb heater is locally heated more quickly as compared with other regions at the time of the electrification.

As described above, the honeycomb heater of the present invention is a partial heating type (a local heating type) heater in which an orifice for narrowing a current flow path is formed as a resistance adjusting means at a predetermined position of the honeycomb structure to provide a high-resistance position where the current flow path is partially narrowed, whereby the specific region of the honeycomb heater can be locally heated more quickly as compared with the other region.

The honeycomb heater of the present invention which is used for the purpose of purifying an exhaust gas can usually preferably be utilized in a condition where a catalyst layer is supported on the partition walls of the fundamental honeycomb structure so as to cover them, as described hereinafter. Furthermore, the honeycomb heater is provided with a specific region which can be locally quickly heated (this region will be hereinafter referred to as "the quick heating portion", and the other region will be referred to as "the slow heating portion") as described above, whereby the catalyst layer supported on this region can be promptly ignited with a relatively low electric power, and heat of reaction obtained by this catalytic reaction accelerates the heating of the whole honeycomb heater, a light-off catalyst and a main catalyst which are usually arranged on the downstream side of this heater. Therefore, when the heater of the present invention is used, harmful substances in the exhaust gas, particularly HC generated in large quantities at the time of a cold start can be effectively purified with the low electric power.

BRIEF DESCRIPTION OF THE DRAWINGS

FIGS. 3(a), 3(b) and 3(c) are illustrative views showing still another embodiment of the present invention. FIG. 3(a) is a plan view, and FIGS. 3(b) and 3(c) are partially enlarged views.

FIG. 4(a) is a plan view, and FIG. 4(b) is a front view.

DESCRIPTION OF THE PREFERRED EMBODIMENTS

Figure 1:
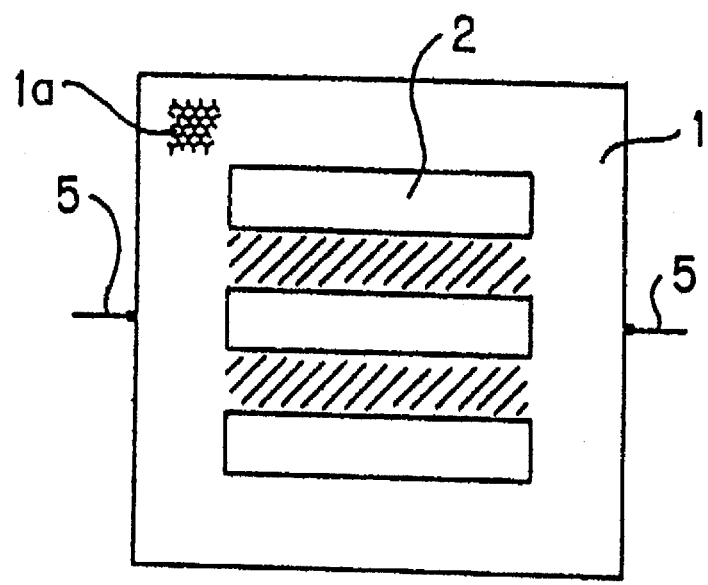
FIG. 1 is an illustrative view showing one embodiment of the present invention.

Now, the present invention will be described in more detail.

In the present invention, a honeycomb structure is made of a conductive material, and examples of the conductive material include metals such as ferrite-containing stainless steel and austenite-containing stainless steel, and ceramics such as perovskite and SiC. However, from the viewpoints of heat resistance and thermal shock resistance, the ferrite-containing stainless steel comprising Fe—Cr—Al is most preferable. Alternatively, partition walls themselves of the honeycomb structure do not have to be made of a conductive material, and for example, an insulating material such as cordierite may be coated with a conductive material such as Pt or cermet by plating or a sputtering process, whereby the coating film of the conductive material can generate heat by electrification.

The honeycomb structure may be prepared by winding up a metal foil or by an extrusion technique in accordance with a powder metallurgy method, but in view of the durability of the structure, particularly in order to get rid of a telescoping under severe conditions, it is preferable to use the extrusion technique.

No particular restriction is put on the sectional shape (the cell shape) of passages which extend through the honeycomb structure, and any shape of polygons such as rectangle and hexagon, circle and corrugation can be used. However, in view of thermal shock resistance, the flexible cell shape which can relieve thermal stress, for example, the hexagonal shape is preferable.

Next, among the honeycomb structures which can be used in the present invention, an embodiment of a process for preparing the metallic honeycomb structure will be described.

In the first place, a metal powder material having a desired composition is prepared from, for example, an Fe powder, an Al powder, a Cr powder or a powder of an alloy thereof. Next, the thus prepared metal powder material is mixed with an organic binder such as methyl cellulose or polyvinyl alcohol and water, and the resulting mixture is then extruded into a desired honeycomb shape.

In the mixing step of mixing the metal powder material with the organic binder and water, it is preferable to mix the metal powder with an antioxidant such as oleic acid prior to the addition of water. Alternatively, it is also preferable to use the metal powder beforehand subjected to an antioxidizing treatment.

Next, the extruded honeycomb is fired at a temperature of 1,000° to 1,400° C. under a non-oxidizing atmosphere. In this case, the firing is preferably carried out under the non-oxidizing atmosphere containing hydrogen, because Fe or the like can be utilized as a catalyst to decompose and remove the organic binder, thereby obtaining a good sintered body.

If the firing temperature is less than 1,000° C., the molded article is not sintered, and if it is more than 1,400° C., the deformed sintered body is inconveniently obtained.

Next, the surfaces of the partition walls and pores of the obtained sintered body are coated with a heat-resistant metal oxide, if desired. Preferable methods for coating the same with the heat-resistant metal oxide are as follows.

(1) The metal honeycomb structure is thermally treated at 700° to 1,100° C. in an oxidizing atmosphere.

(2) The surfaces of the partition walls and pores of the sintered body are plated with aluminum or the like (e.g., a gaseous plating), followed by a heat treatment at 700° to 1,100° C. in the oxidizing atmosphere.

(3) The sintered body is immersed in a metal hot melt of aluminum or the like, followed by a heat treatment at 700° to 1,100° C. in the oxidizing atmosphere.

(4) The surfaces of the partition walls and pores of the sintered body are coated with an alumina sol, followed by a heat treatment at 700° to 1,100° C. in the oxidizing atmosphere.

The temperature of the heat treatment is preferably in the range of 900° to 1,100° C. from the viewpoints of heat resistance and oxidation resistance.

The honeycomb structure is provided with at least two electrodes for electrification. Here, the electrodes include an electrode on an earth side. The electrodes are connected to a power source such as a battery or a capacitor via a switch and a control device so that they may be electrified, and they can be attached to an outer or an inner periphery of the honeycomb structure.

It is preferable that a catalyst layer containing a catalyst-activating substance is supported on the partition walls of the honeycomb structure so as to cover them.

The catalyst layer supported on the partition walls of the honeycomb structure comprises a carrier having a large surface area and the catalyst-activating substance supported on the carrier. Typical examples of the carrier having the large surface area include $\gamma$-$Al_2O_3$, $TiO_2$, $SiO_2$-$Al_2O_3$ and perovskite. Typical examples of the catalyst-activating substance include noble metals such as Pt, Pd and Rh, and base metals such as Cu, Ni, Cr and Co. Among others, preferable is an example in which one or more noble metals of Pt, Pd and Rh are supported on $\gamma$-$Al_2O_3$.

The thus constituted honeycomb heater of the present invention has end surfaces on gas inlet and gas outlet sides, and an exhaust gas flows from the gas inlet side end surface to the gas outlet side end surface via the passages. The honeycomb heater is usually held preferably in an insulating state in a metallic can, and it is arranged so that the exhaust gas may be introduced into the honeycomb heater in the can through its gas inlet side end surface.

The honeycomb heater is heated by the electrification, but at this time, it is necessary that orifices are formed so that a specific region of the honeycomb heater, preferably a specific region including at least a gas inlet side end surface neighborhood may be locally heated more quickly as compared with the other region of the heater.

The reason why the quick heating region is constituted so as to include at least the gas inlet side end surface neighborhood is that, as described above, the heat of reaction generated by locally quickly heating the upstream portion of the honeycomb heater can transfer to the lower portion of the honeycomb heater in turn to heat the catalyst layer on the downstream side of the honeycomb heater or the light-off catalyst or the like arranged in the downstream portion of the honeycomb heater. Conversely, if a gas outlet side end surface neighborhood alone is heated by the electrification, the gas inlet side end surface neighborhood is not heated, and so the same functions as a heat sink. In consequence, the power to be applied and a purification efficiency are unsatisfactory.

It is also one of suitable embodiments to uniformly (locally as seen from the section of a gas passage) and quickly heat the honeycomb heater from the gas inlet side end surface to the gas outlet side end surface in a gas flow direction. In this case, a large amount of the heat of reaction generated by the catalyst on the heater is useful to quickly activate the light-off catalyst or the main catalyst which is usually arranged immediately in the rear of the heater.

In the present invention, the phrase "locally quickly heated" means that one or more quick heating portions and one or more slow heating portions (inclusive of non-heating portions) are present in the heater, and the honeycomb heater is heated so that the slow heating portions may be lower than a catalyst ignition temperature by 50° C. or more, preferably 100° C. or more, when the quick heating portions have reached the catalyst ignition temperature. If the temperature difference is less than 50° C., the heater is wholly heated, so that the intended effect of the power reduction is poor. If it is more than 100° C., the suitable purification performance can be exerted by the application of the relatively low electric power.

Moreover, the phrase "catalyst ignition temperature" means a temperature at which the reaction intermittently occurs without the extinction of the catalyst, and the aim of the catalyst ignition temperature is 350° C. or more. The catalyst deteriorates when used for a long period of time, and in the case of the local heating type heater, there is a problem of the slow heating portions drawing heat. Therefore, a temperature of 500° C. or more can be surely considered to be the catalyst ignition temperature.

Next, some embodiments of the present invention will be described with reference to the attached drawings.

In the first embodiment, as shown in FIG. 1, a plurality of long and narrow orifices 2 having a relatively large size are formed in a honeycomb structure 1 substantially in parallel with each other in a gas flow direction. The honeycomb structure 1 includes a plurality of partition walls 1a that define passages, also shown in FIGS. 2 and 4(a). In such a constitution, upon electrification through electrodes 5, a current density is increased in a limited region between the orifices 2, shown in FIG. 1 as hatched regions. Those regions are predominantly heated to become quick heating portions.

Figure 4A:
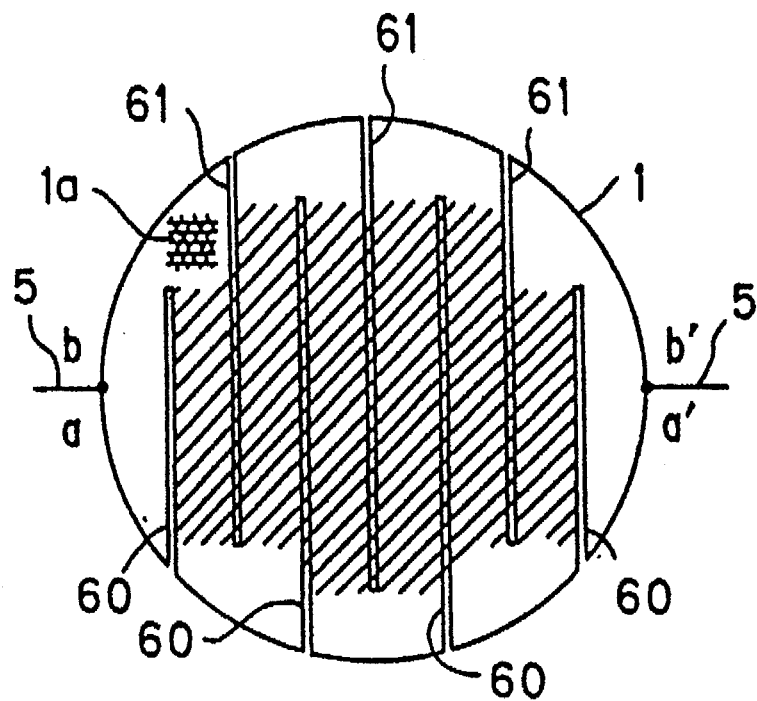
FIGS. 4(a) and 4(b) are illustrative views of a conventional known resistance adjustable type heater having slits.
Figure 4B:
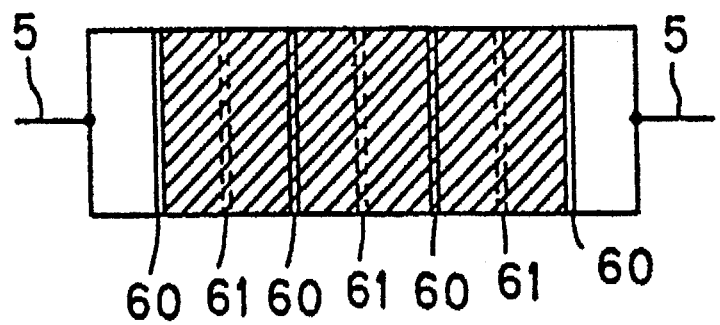

FIGS. 4(a) and 4(b) show a conventional known resistance adjustable type heater having slits which is described as an example in Japanese Patent Application Laid-open No. 295184/1991 already filed by the present applicant. In this known heater, the outer periphery of a honeycomb structure 1 is divided into a first semicircular outer periphery a–a' and a second semicircular outer periphery b–b' by two electrodes 5 so that these peripheries may face each other, and first slits 60 and second slits 61 are alternately arranged at substantially equal intervals. Here, the first slits 60 cut the first semicircular outer periphery a–a' but do not cut the second semicircular outer periphery b–b', and the second slits 61 cut the second semicircular outer periphery b–b' but do not cut the first semicircular outer periphery a–a'.

In such a constitution, current flows through a region between the pair of slits, so that the whole heater is uniformly heated as shown by hatches in a plan view of FIG. 4 (a) and a front view of FIG. 4 (b). Therefore, it is difficult to achieve quick heating with a low electric power.

Figure 2:
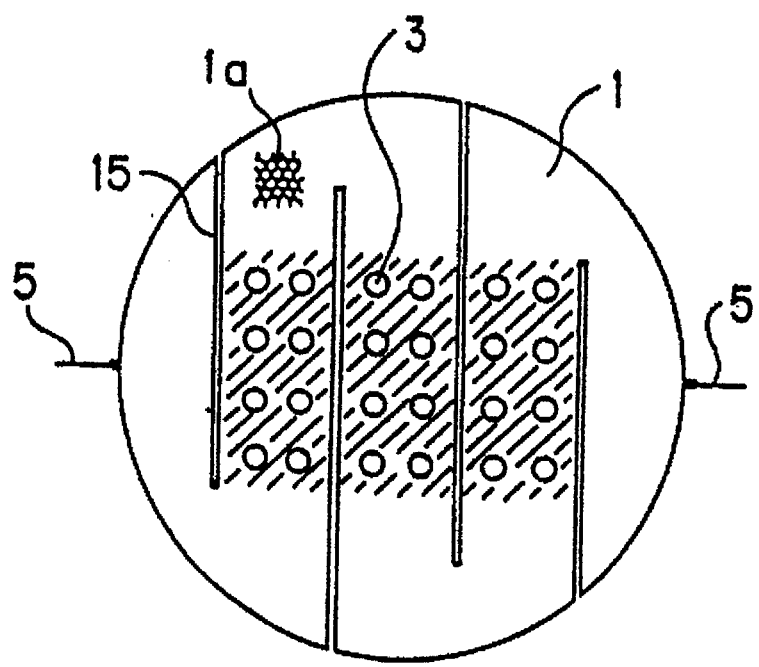
FIG. 2 is an illustrative view showing another embodiment of the present invention.

In a second embodiment, as shown in FIG. 2, many orifices 3 having a relatively small size (larger than passages in a honeycomb structure) are partially formed in the honeycomb structure 1 in a gas flow direction. In this case, as shown in FIG. 2, slits 15 are formed in addition to the orifices 3 to adjust resistance. FIG. 2 represents a preferable embodiment, which permits easy control of a quick heating portion due to slits 15 and orifices 3. In such a construction, upon electrification of the honeycomb structure through electrodes 5, a current density is increased in the hatched region shown in FIG. 2. This region, having removed material due to the orifices 3 between the slits 15, is predominantly heated and is the quick heating portion.

In a third embodiment, as shown in a plan view of FIG. 3 (a) and partially enlarged views of FIGS. 3 (b) and 3 (c), partition walls of a honeycomb structure 1 are partially eliminate to form orifices 4. The partially enlarged views of FIGS. 3 (b) and 3 (c) show examples of the elimination of the partition walls having cell shapes of hexagon and square, respectively, but the hexagonal shape shown in FIG. 3 (b) is preferable from the viewpoint of strength. In such a constitution, upon electrification through electrodes 5, a current is concentrated in the partition walls represented by thick lines in FIGS. 3 (b) and 3 (c), so that these partition walls become quick heating portions. Also in this embodiment, it is preferable that slits 15 are used together as in the above-mentioned second embodiment.

The conceptions of the first to third embodiments described above can be optionally combined and used. However, they are mere examples, and in the present invention, various constitutions other than the above-mentioned embodiments can be employed, so long as they permit a specific region of the honeycomb heater to be locally heated more quickly as compared with the other region. It is also possible to combine the constitutions of the present invention with various conventional known resistance adjusting means.

For example, there can be suitably combined and used a means by which the thickness or the cell density of the partition walls in the honeycomb structure is partially changed to adjust the resistance. Also in the case that slits are used together as shown in FIGS. 2 and 3(a), the forming position and length of the slits, a space between the pair of slits, and the like can be optionally set.

In the present invention, the area of the quick heating portion is preferably in the range of 5 to 50% of the sectional area of the gas passage. If the area of the quick heating portion is less than 5% of the sectional area of the gas passage, a large amount of the gas passes through the slow heating portion without being purified, and heat of reaction by the catalyst in the quick heating portion is not so expected, so that a purification efficiency lowers. On the other hand, if it is more than 50%, the weight of the quick heating portion increases, and so it is necessary to increase the electric power to be applied, with the result that the effect of reducing the electric power decreases. The preferable ratio of the area of the quick heating portion to the sectional area of the gas passage is in the range of 10 to 40%, whereby there can be reduced 30% or more of the electric power required to heat a whole heating type heater in which most of the section of the gas passage is uniformly heated, and even by such a reduced electric power, a similar purification efficiency can be obtained.

The area of the quick heating portion can easily be calculated, for example, in the following way. That is to say, in the first place, the heating properties of the quick heating portions are evaluated in still air by the use of thermovision. Next, in order to evaluate this honeycomb heater by an actual driving test, many thermocouples are attached to the honeycomb heater, and temperatures at many positions in the quick heating portions are measured, electrifying and heating the quick heating portions in accordance with an FTP (federal test procedure) test. Thus, the area of the quick heating portions can be determined from a temperature distribution on the thermovision and the actual heating properties of the heater.

The honeycomb heater of the present invention aims at a low-power type, and so the preparation of the relatively small heater is preferable. Concretely, the volume of the gas passage portion is set to about 30 to 300 cc. If the volume of the gas passage portion is less than 30 cc, the mechanical strength of the heater is poor and the effective area of the catalyst on the heater is limited, so that the heat of reaction obtained therefrom is insufficient and hence the desired purifying performance cannot be obtained. Conversely, if it is more than 300 cc, the honeycomb heater becomes a local heating type, but the weight of the heater increases, so that the application of an increased electric power is required. The preferable volume of the heater is in the range of 40 to 150 cc, and the effective purification can be achieved with a low electric power of less than 3 kW, depending upon a position where the heater is arranged.

"The low electric power" referred to herein means that wattage×time is as low as possible, but the long-time electrification at a low wattage is more preferable than the short-time electrification at a high wattage. That is to say, for the electrification at high wattage, a high voltage and/or a large current is necessary. In the case of the high voltage, a complicated power source system and control system are required, and in the case of the large current, extremely thick cables and the like are required. Thus, in the case of a gasoline car, the battery power source and the current are preferably adjusted to be 12 V and 200 A or less, respectively. In this case, a power of 2 kW or less is to be applied to the heater, in view of internal resistances of the battery and the control system. As the power source, an alternater and an ultracapacitor can be preferably used in addition to the battery.

The length of the honeycomb heater is usually in the range of 6 to 40 mm, depending upon the sectional area of the honeycomb heater. If the length of the honeycomb heater is less than 6 mm, deformation occurs owing to creep at the time of a high temperature, and if it is more than 40 mm, the honeycomb heater deforms owing to thermal stress generated in the heater.

The length of the quick heating portion in a gas flow direction is 25 mm or less, and it is equal to or less than the length of the heater. If the length of the quick heating portion is more than 25 mm, the heat capacity of the quick heating portion increases, so that the problem of the electric power to be applied takes place inconveniently.

The thickness of the partition walls of the honeycomb heater is preferably in the range of about 40 to 300 μm, and the cell density is preferably in the range of 150 to 600 cells/inch$^2$.

In order to efficiently purify harmful substances in the exhaust gas, particularly HC generated in large quantities at the time of the cold start by the use of the honeycomb heater of the present invention described above, the electrification is preferably carried out so that the quick heating portion may reach a catalyst ignition temperature within 20 seconds from the cold start.

The electrification of the heater is carried out in an optional manner, for example, by a preheating means for starting the electrification before engine starting, a postheating means for starting the electrification immediately after engine starting, or a combination of the preheating means and the postheating means, and this electrification can be done continuously or intermittently. In view of the simplicity of the control system, the postheating means is preferable, and it is also preferable to continuously apply the power once at the time of the cold start.

It is preferred that the temperature of the quick heating portion reaches 500° C. or more as early as possible, and in the Bag 1 of an FTP test, it is one aim that the temperature is reached within 20 seconds (at the time of idling). At this time, the upper limit of the temperature of the quick heating portion is about 1,000° C., and so the temperature of the quick heating portion is preferably 1,000° C. or less. If the temperature of the quick heating portion is in excess of 1,000° C., there is a fear that the honeycomb heater is deformed or broken owing to thermal stress generated by a temperature difference between the quick heating portion and the slow heating portion.

In the case that the exhaust gas purification system is constituted of such a honeycomb heater as in the present invention, the so-called light-off catalyst or main catalyst is usually arranged on the downstream side of the honeycomb heater. Since the honeycomb heater is operated with low power, its size is relatively small, and so the honeycomb heater itself is insufficient to purify all the HC exhausted at the cold start. Therefore, the relatively small (about 0.2 to 1.2 l) light-off catalyst is arranged on the downstream side of the honeycomb heater. In addition, for the purpose of improving the purification performance at a steady drive (e.g., Bag 2), the so-called main catalyst having a relatively large volume (about 1 to 3 l) is arranged on the downstream side of the light-off catalyst.

As another constitution, for example, the relatively small (about 0.2 to 1.2 l) light-off catalyst may be arranged on the most upstream side of the exhaust gas flow passage, and the honeycomb heater may follow, and the light-off catalyst and the main catalyst may be further arranged on the downstream side of the honeycomb heater. In this case, the application of a little more power to the honeycomb heater is required as compared with the constitution in which the honeycomb heater is arranged on the most upstream side, but the most upstream light-off catalyst functions as a thermal shock absorber, so that it is not necessary any more to be concerned about the durability of the honeycomb heater.

The above-mentioned "light-off catalyst" and "main catalyst" are common names, and in short, they are catalysts having a catalytic function capable of purifying the exhaust gas discharged from an internal combustion engine. In general, as these catalysts, there can be used ceramic or metallic honeycomb structures on which a catalyst activating substance having the catalytic function is supported in the form of a catalyst layer.

The honeycomb heater is preferably arranged at the so-called manifold position in the vicinity of an engine exhaust port so as to utilize exhaust heat. In this case, the honeycomb heater is exposed to particularly severe exhaust gas conditions, and so it is preferable to use the honeycomb heater prepared by an extrusion method, as described above. When arranged at the manifold position, the honeycomb heater exerts the suitable purification performance with an electric power of 1 kW or less.

At the time of the cold start, a car is usually driven in a rich fuel state, but in such a state, the HC purification performance of the honeycomb heater is insufficient, even if the heater is quickly heated. Thus, the introduction of secondary air is effective, or it is also preferable that after engine crank, the amounts of the fuel and air are adjusted to shift the composition of the exhaust gas to a nearly stoichiometric amount or a slightly lean side.

As described above, according to the present invention, harmful substances in an exhaust gas discharged from an internal combustion engine, particularly HC generated in large quantities at the time of a cold start can be effectively purified with a low electric power.

Next, the present invention will be described in more detail with reference to examples, but the scope of the present invention should not be limited to these examples.

EXAMPLE 1

A honeycomb heater of the above-mentioned third embodiment was prepared in accordance with the following preparation procedure. In this example, the honeycomb heater had such a hexagonal shape as in FIG. 3 (b), and partition walls were eliminated and 5 slits were alternately formed from each of mutually faced semicircular outer peripheries of a honeycomb structure. The distance from the tip of each slit to the outer periphery (the distance on a line extended from the slit) was set to 7 mm.

[Preparation method of honeycomb heater]

An Fe powder, a Cr-30 Al powder (wt %), an Fe-50 Al powder (wt %), an Fe-20 B powder (wt %) and a $Y_2O_3$ powder, all having an average particle diameter of 44 μm or less were mixed so as to obtain a composition of Fe-16 Cr-8 Al-0.05 B-0.5 $Y_2O_3$. Next, 4 g of methyl cellulose as an organic binder and 1 g of oleic acid as an antioxidant were added to and mixed with 100 g of the resulting mixture. After the preparation of such a clay, it was then extruded into a cylindrical honeycomb article.

This honeycomb article was dried at 90° C. for 16 hours in the atmosphere, and then held at 1,325° C. for 2 hours to sinter the article. Next, the article was subjected to a heat treatment at 1,150° C. for 30 minutes in air.

In accordance with the above-mentioned procedure, a honeycomb structure was obtained which had an outer diameter of 93 mm, a thickness of 12 mm, a partition wall thickness of 0.1 mm and a hexagonal cell density of 450 cells/inch$^2$. The porosity of this honeycomb structure was 2% (substantially non-porous), and a protective layer of an $Al_2O_3$ component was formed on the surface of the honeycomb structure.

After the partition walls of the honeycomb structure were partially eliminated, slits were formed as described above to prepare quick heating portions.

After the formation of the slits, a mixture of γ-$Al_2O_3$ and $CeO_2$ was prepared so that a weight ratio of γ-$Al_2O_3$:$CeO_2$ was 70:30, and water and a trace amount of nitric acid were then added to the mixture. Afterward, the mixture was ground by a wet method to prepare a carrier slurry, and a wash coat was then formed on the honeycomb structure in accordance with a dipping method by the use of this carrier slurry. Next, this wash coat was dried, and then fired at a temperature of 500° C. to cover the honeycomb structure with γ-$Al_2O_3$ and $CeO_2$. The thus treated honeycomb structure was immersed in an aqueous solution comprising palladium nitrate, chloroplatinic acid and rhodium nitrate for about 20 minutes so that a molar ratio of Pd:Pt:Rh might be 6:5:1 and so that the total amount of the supported components might be 80 g/ft$^3$, whereby a catalyst composition was supported on the honeycomb structure.

Next, electrode bolts were welded at two positions on the outer periphery of the honeycomb structure to prepare a honeycomb heater. This honeycomb heater was held in a metallic can by fixing the outer periphery of the honeycomb heater via an insulating material.

EXAMPLE 2

A honeycomb heater of the above-mentioned second embodiment was prepared in accordance with the same preparation procedure as in Example 1. In this example, many through-orifices were formed and 5 slits were alternately formed from each of mutually faced semicircular outer peripheries of a honeycomb structure. These orifices were provided in the vicinity of the central portion of the honeycomb structure so as to narrow a current flow path between each pair of slits. The distance from the tip of each slit to the outer periphery (the distance on a line extended from the slit) was set to 7 mm.

EXAMPLE 3

A honeycomb heater of the above-mentioned first embodiment was prepared in accordance with the same preparation procedure as in Example 1. In this case, the shape of a honeycomb structure was a rectangular parallelepiped of 90 mm×90 mm×12 mm (thickness), and a plurality of orifices (through-orifices having a section of 2 mm×70 mm) were formed in parallel in the honeycomb structure.

Comparative Example 1

In accordance with the same procedure as in Example 1, a conventional known resistance adjustable type heater was prepared in which first slits 60 and second slits 61 were alternately formed from mutually faced semicircular outer peripheries at substantially equal intervals, as shown in FIGS. 4(a) and 4(b). In this case, the number of each of the first slits and the second slits was 5. Furthermore, the number of the cells between each pair of slits was 6, and the distance from the tip of each slit to the outer periphery (the distance on a line extended from the slit) was set to 7 mm.

[FTP Test]

Figure 5:
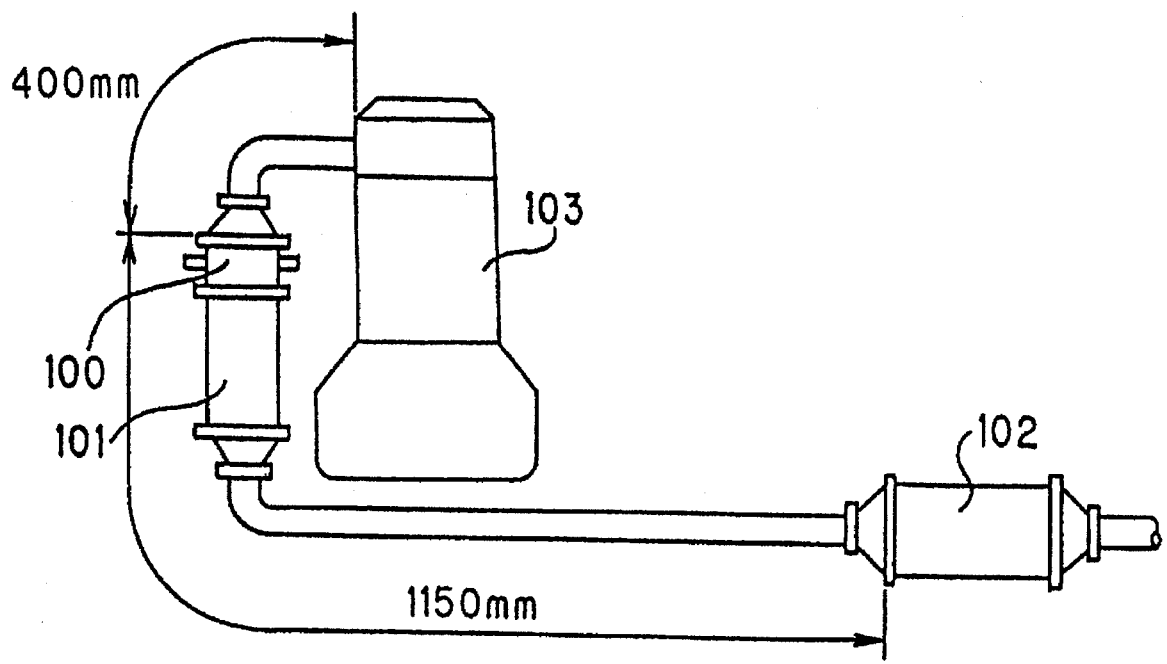
FIG. 5 is a schematic view of a manifold system used to evaluate the performance of the heaters in examples.

The thus obtained honeycomb heaters in Examples 1 to 3 and Comparative Example were used, and a light-off catalyst having a volume of 0.9 l was arranged immediately on the downstream side of each heater. Next, a main catalyst having a volume of 1.7 l was arranged on the further downstream side of the light-off catalyst to constitute an exhaust system shown in FIG. 5. In the drawings, reference numeral 100 was a honeycomb heater, numeral 101 was a light-off catalyst, 102 was a main catalyst, and 103 was an engine. This engine was an L4 type having a displacement volume of 2,000 cc.

The honeycomb heater, the light-off catalyst and the main catalyst were all exposed to a stoichiometric exhaust gas having an inlet temperature of 850° C., and were consumed under accelerated conditions in a mode in which a fuel was cut for 5 seconds every one minute to deteriorate them. The thus treated honeycomb heater, light-off catalyst and main catalyst were then used.

Bag emission was measured in accordance with FTP (federal test procedure) to evaluate cold start properties of the honeycomb heaters of examples. During this measurement, secondary air was introduced into the exhaust system from the upstream side of the honeycomb heater at 120 l/min for 100 seconds from the start of the engine. Furthermore, electrification was given by the use of a constant-voltage generator, and voltage was regulated so as to obtain 1 kW value. An electrification time was 30 seconds after engine starting.

TABLE 1

| | FTP Performance (HC emission) | |
|---|---|---|
| | Bag 1A* (g) | Bag 1 (g/mile) |
| Example 1 | 0.75 | 0.19 |
| Example 2 | 0.77 | 0.20 |
| Example 3 | 0.81 | 0.21 |
| Comp. Ex. | 0.86 | 0.25 |

*Bag 1A: The amount of HC exhausted for 140 seconds from the start of an engine.

What is claimed is:

1. A honeycomb heater, comprising:
    a honeycomb structure including a plurality of partition walls comprised of a conductive material, said partition walls forming a plurality of passages extending substantially parallel to a gas flow direction, said honeycomb structure having a first end providing a gas inlet and a second end providing a gas outlet, and a plurality of orifices extending through the honeycomb structure, the orifices having a hydraulic diameter that is larger than a hydraulic diameter of the passages, said orifices being arranged to narrow a current flow path through the honeycomb heater thereby forming a first portion of the honeycomb heater that is adapted to locally heat more quickly than a second portion of the honeycomb heater; and at least two electrodes connected to the honeycomb structure for flowing current through the honeycomb structure.

2. The honeycomb heater of claim 1, further comprising a catalyst layer covering the partition walls.

3. The honeycomb heater of claim 1, wherein said first portion has a cross-sectional area of 5 to 50% of the entire cross-sectional area of the honeycomb heater through which gas flows.

4. The honeycomb heater of claim 1, wherein said first portion includes at least a portion of the gas inlet of the honeycomb heater.

5. The honeycomb heater of claim 1, wherein said orifices are formed by removing portions of partition walls of the honeycomb structure.

6. The honeycomb heater of claim 1, further comprising slits extending into the honeycomb structure for adjusting resistance.

* * * * *